June 28, 1966  L. D. PARRINO  3,258,029
CONTROL DEVICE AND SPRING THEREFOR
Filed Jan. 13, 1964
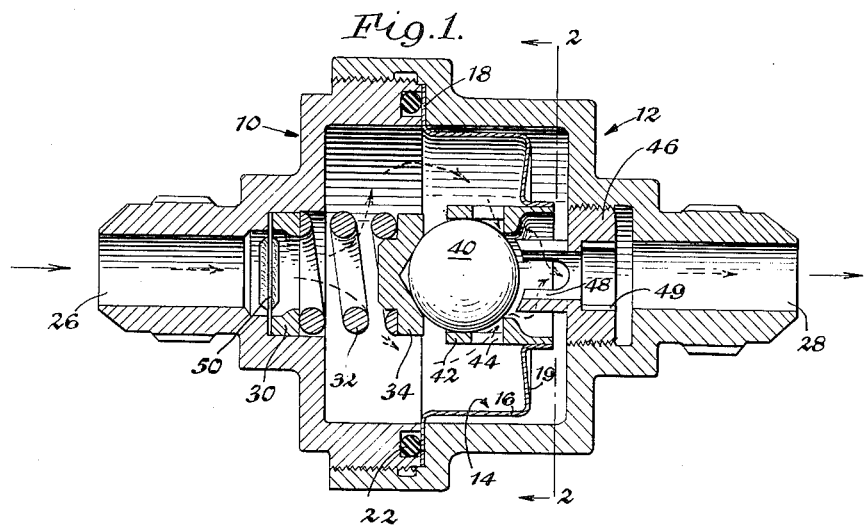
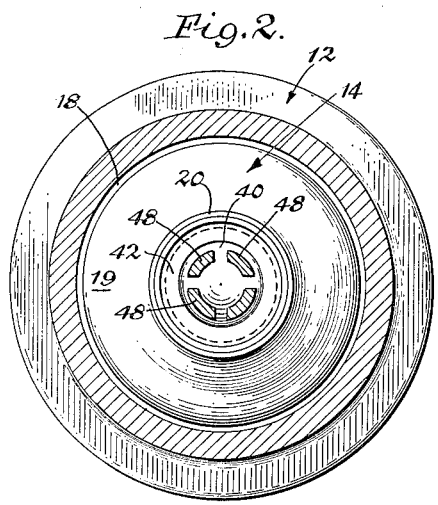
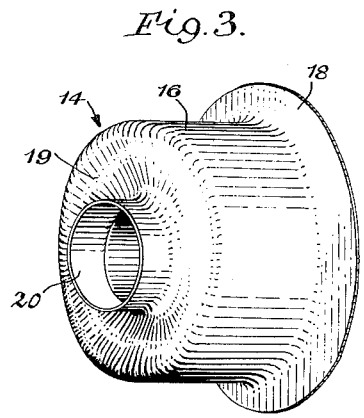
INVENTOR.
LEONARD D. PARRINO
BY
Bean, Brooks, Buckley+Bean
ATTORNEYS 3,258,029
CONTROL DEVICE AND SPRING THEREFOR
Leonard D. Parrino, Buffalo, N.Y., assignor to Bell
Aerospace Corporation, Wheatfield, N.Y.
Filed Jan. 13, 1964, Ser. No. 337,403
2 Claims. (Cl. 137—508)

This invention relates to novel fluid pressure-responsive flow control devices, and has for one of its objects to provide an improved control device for use as for example in pressure relief valves; pressure regulators; fluid pressure operated devices; temperature regulators; pressure and temperature gauges; or the like.

A further object of this invention is to provide an improved fluid-sealing resilient diaphragm device for use in mechanisms as aforesaid, which at the same time provides a fluid seal and a spring action which demonstrates a substantially uniform spring load characteristic throughout the operative spring deflection range.

Another object is to provide an improved seal-spring device as aforesaid which is rugged and of simple design and construction; which requires the use of no auxiliary springs; and which may be easily designed and constructed to precisely meet a predetermined spring-stiffness specification. Furthermore, the device of the invention may be constructed to provide a wide variety of fluid pressure displacement characteristics while withstanding many times its normal working pressure without damage. The device is particularly free from friction and hysteresis losses, and is of such compact form as to occupy less space than that required for prior type combination diaphragm and spring or bellows and spring devices of corresponding capabilities.

Other objects of the invention will be apparent from the following specification and the accompanying drawing, in which:

FIG. 1 is a longitudinal sectional view through one example of a control device embodying the invention;

FIG. 2 is a section taken on line 2—2 of FIG. 1; and

FIG. 3 is a disassembled perspective view of the spring-bellows component of the mechanism.

As shown by way of example herein, the invention may be embodied in a mechanism of the pressure relief valve type. It is known to be desirable in such mechanisms to provide a steep seat-loading curve characteristic, becoming discontinuous as the cracking pressure is approached; such as has been previously sought for example through use of a buckling spring member and a rigid stop for the moving poppet. Such prior devices have, however, been less than satisfactory for various reasons, and the present invention has for a main object the provision of a novel spring-diaphragm facilitating a valve design incorporating the above set forth principle, while at the same time minimizing friction and hysteresis losses. This object is attained through use of a novel hat-shaped spring element functioning simultaneously as a fluid-seal and as a spring demonstrating substantially uniform spring load characteristics throughout the entire operative range of its deflection. Thus the valve may be designed to decrease the band between cracking pressure and reseat pressure, and cracking pressure and full flow pressure.

More specifically, the valve mechanism employs a novel spring element which allows the valve to open to full flow relief position without requiring any pressure increase over the valve "cracking" pressure, due to unique spring characteristics of the "Belleville" spring type. Because hysteresis due to friction is eliminated, an improved reseat performance is obtained. The mechanism may be provided of all-metal or other construction, being thereby adapted to handle all fluids including corrosives, and at relatively high temperatures.

As shown in the drawing herewith, the pressure relief valve of the invention may be constructed to include threaded coupling members 10, 12 defining a cylindrical housing having therewithin a fluid chamber. A hat-shaped Belleville type spring in accord with the present invention as indicated generally at 14 is provided to comprise a cylindrical body portion 16, an end flange or rim 18, and a "crown" or end wall portion 19 which is centrally apertured and formed with a hub flange or collar portion 20 (FIG. 3). The spring diaphragm device 14 is preferably formed of one piece of spring metal, or the like. As shown in FIGS. 1, 2, the rim flange portion 18 of the spring element is clamped between the opposed end faces of the coupling members 10, 12 so as to be rigidly gripped therebetween; a resilient seal ring as indicated at 22 (FIG. 1) being preferably employed to render the interconnection fluid-tight. Thus, the spring device 14, when disposed as shown in FIG. 1 partitions the fluid chamber interiorly of the device.

As shown best in FIG. 1, the coupling member 10 includes a fluid inlet nipple portion 26 (adapted for connection to the pressured fluid inlet conduit which is not shown) while the coupling member 12 is formed with a corresponding outlet connection portion as indicated at 28. A spring seat ring 30 is disposed against an internally shouldered portion of the housing 10 to receive one end of a compression spring 32. At its other end the spring 32 cradles a conical valve seat member 34. The member 34 bears against a ball shaped valve member 40 which resides within a cage member 42 having fluid inlet apertures as indicated at 44. The cage 42 is fixedly mounted in the collar portion 20 of the spring member 14, and the cage and collar portions of the spring are fixedly interconnected as by welding or the like.

The coupling member 12 is interiorly bored and tapped to receive in threaded relation therein a ball-stop member 46 having a plurality of abutment fingers 48 extending inwardly therefrom and beveled at their ends so as to cradle the valve ball 40 thereon. The stop device 46 is positionally adjustable within the coupling member 12 by simple rotation therein, as by manipulation of a screw driver through the outlet orifice 28 and into sliding connection with splines 49 formed on the inner wall of the centrally bored portion of the stop member. A fluid filter device is readily incorporated within the mechanism, as for example in the form of a filter disk 50 (FIG. 1) disposed between the spring seat ring 30 and the adjacent coupling shoulder.

Thus, it will be apparent that the parts may be so dimensioned and arranged that under "normal" operative conditions the valve parts will remain in the positional relationships shown in FIG. 1. In this condition the spring 32 is maintaining the ball 40 in seated relation to the member 42, whereby the inlet fluid is prevented from escaping through the outlet 28; the inlet fluid pressure being contained by the spring diaphragm 14, thereby completing the seal between the inlet and outlet ends of the device. In event, however, an excess pressure develops on the fluid at the inlet side, the diaphragm 14 will "give" and permit the cage member 42 to move to the right as viewed in FIG. 1 until the ball 40 abuts the fingers 48 of the stop member 46. The previously maintained seal between the ball and the seat member 42 is now broken and fluid escapes therethrough (as illustrated by the broken line directional arrows) into the outlet conduit. It will be appreciated that the mechanism may be easily adjusted to so operate at any prescribed pressure condition, by simple adjustments of the position of the stop member in the housing 12, as explained hereinabove. Upon return of the inlet pressure to "normal" the resiliency characteristics of the diaphragm 14 will cause it to return to its configuration as shown in FIG. 1 whereupon the valve ball 40 will be reseated on the member 42 thereby resealing the system to which the device is applied.

It is a particular feature of the device of the present invention that the hat-shaped diaphragm member 14 provides certain unique spring characteristics in that the device will deflect when operating as explained hereinabove without appreciable variations in spring load effects. This is due to the fact that axial movements of the collar portion 20 of the spring device due to pressure changes within the device are accommodated without appreciable elastic distortion of the sectional profile of the spring device. Hence, the relief valve of the invention may be designed and constructed to feature a uniform, steep, seat-loading curve which becomes discontinuous only at the prescribed cracking pressure. This minimizes friction and hysteresis influences and/or losses; and furthermore, the operative parts are of such nature as to be substantially unaffected in their functioning by vibration and/or temperature changes. Hence by means of a structurally simple and rugged mechanism an improved performance type valve is obtained.

It will of course be appreciated that although the invention has been illustrated and described in detail herein only in conjunction with one specific form of relief valve, it may have a large variety of other applications and therefore is not so limited except as departing from the scope of the following claims.

I claim:
1. A pressure relief valve assembly characterized by a steep seat-loading curve which is discontinuous at cracking pressure and by the substantial absense of friction and hysteresis losses, which comprises:
   a housing having a hollow interior provided with a fluid pressure inlet and a fluid pressure outlet,
   a valve device normally dividing the interior of said housing into two separate chambers, one communicating with said inlet and the other with said outlet, and adapted to establish communication between said chambers in response to fluid pressure at said inlet exceeding a predetermined value,
   said valve device including a hat-shaped spring diaphragm having a rim portion, a cylindrical side wall portion extending from said rim portion, a cylindrical collar portion disposed concentrically of said side wall portion at that end thereof remote from said rim portion, and a crown portion joining said collar portion to said end of the side wall portion remote from said rim portion, said rim portion being rigidly secured to said housing and consitituting the sole connection between said housing and said valve device, a seat member carried by said collar portion, a valve member, resilient means acting between said housing and said valve member for normally seating said valve member on said seat member and permitting said valve member, while so seated, to follow movements of said collar portion, and abutment means for arresting following motion of said valve member at that position of said collar portion corresponding to said predetermined pressure, said spring diaphragm being constructed of spring material and said crown portion being dished, in a direction away from said abutment means, so that fluid pressure fluctuation at said inlet effects axial movement of said collar portion substantially solely as a result of deformation of said crown portion and without any significant deformation of the remainder of said spring diaphragm.

2. The pressure relief valve according to claim 1 wherein said valve seat member is in the form of a tubular cage received within and secured to said collar portion.

References Cited by the Examiner
UNITED STATES PATENTS

| | | | |
|---|---|---|---|
| 28,722 | 6/1860 | Whitaker | 137—508 |
| 2,115,340 | 4/1938 | McCrosson | 137—508 X |
| 2,479,915 | 8/1949 | Eastman | 92—100 X |
| 2,693,821 | 11/1954 | Cornelius | 137—508 |
| 2,727,117 | 12/1955 | Bergson | 267—1 X |
| 3,034,535 | 5/1962 | McGay | 92—99 X |
| 3,059,692 | 10/1962 | Smitley | 137—508 X |

WILLIAM F. O'DEA, *Primary Examiner.*

M. CARY NELSON, ISADOR WEIL, *Examiners.*

H. WEAKLEY, *Assistant Examiner.*